United States Patent
Suzuki et al.

(10) Patent No.: US 11,040,612 B2
(45) Date of Patent: Jun. 22, 2021

(54) UNDERMOUNT DRIVE SYSTEM AND COOLING ARRANGEMENT FOR A VEHICLE

(71) Applicant: HONDA MOTOR CO., LTD., Tokyo (JP)

(72) Inventors: Takanori Suzuki, Saitama (JP); Ryosaku Izawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 16/566,235

(22) Filed: Sep. 10, 2019

(65) Prior Publication Data
US 2020/0079208 A1 Mar. 12, 2020

(30) Foreign Application Priority Data
Sep. 12, 2018 (JP) .............................. JP2018-170801

(51) Int. Cl.
*B60K 1/04* (2019.01)
*B60K 11/04* (2006.01)
(Continued)

(52) U.S. Cl.
CPC ................ *B60K 11/04* (2013.01); *B60K 1/04* (2013.01); *H01M 10/613* (2015.04);
(Continued)

(58) Field of Classification Search
CPC ....... B60K 11/04; B60K 1/04; H01M 10/613; H01M 10/625; H01M 10/66; H01M 10/6556
See application file for complete search history.

(56) References Cited

U.S. PATENT DOCUMENTS

| 4,681,179 | A | * | 7/1987 | Hayashi | ................ | B60K 11/04 |
| | | | | | | 123/41.21 |
| 5,490,572 | A | * | 2/1996 | Tajiri | ................ | B60H 1/00392 |
| | | | | | | 180/65.1 |

(Continued)

FOREIGN PATENT DOCUMENTS

DE 102016208902 A1 12/2016
DE 102017116766 A1 2/2018
(Continued)

OTHER PUBLICATIONS

Feb. 18, 2020, Japanese Office Action issued for related JP Application No. 2018-170801.
(Continued)

*Primary Examiner* — John D Walters
*Assistant Examiner* — James J Triggs
(74) *Attorney, Agent, or Firm* — Paratus Law Group, PLLC (57) ABSTRACT

A vehicle includes a compartment, a front room located in front of the compartment, and a drive device unit provided behind the compartment and below a floor panel. The drive device unit includes a drive device accommodating a motor, and a motor controller which controls the motor. The vehicle includes a first cooling device located in the front room and cooling the motor controller, and a second cooling device located below the floor panel and cooling the drive device.

7 Claims, 6 Drawing Sheets

(51) Int. Cl.
*H01M 10/613* (2014.01)
*H01M 10/625* (2014.01)
*H01M 10/6556* (2014.01)
*H01M 10/66* (2014.01)
*B60K 1/00* (2006.01)
*B60R 16/023* (2006.01)

(52) U.S. Cl.
CPC ..... *H01M 10/625* (2015.04); *H01M 10/6556* (2015.04); *H01M 10/66* (2015.04); *B60K 2001/005* (2013.01); *B60K 2001/006* (2013.01); *B60K 2001/0438* (2013.01); *B60R 16/0238* (2013.01); *B60Y 2200/91* (2013.01); *B60Y 2306/05* (2013.01); *H01M 2220/20* (2013.01)

(56) References Cited

U.S. PATENT DOCUMENTS

| | | | | |
|---|---|---|---|---|
| 8,561,746 | B2* | 10/2013 | Creixell | B62K 25/28 |
| | | | | 180/296 |
| 8,955,628 | B2* | 2/2015 | Murray | B60K 11/04 |
| | | | | 180/68.1 |
| 9,188,052 | B2* | 11/2015 | Tajima | B60K 11/04 |
| 2009/0032318 | A1 | 2/2009 | Ishitoya | |
| 2010/0116568 | A1* | 5/2010 | Kadoi | B60L 3/0046 |
| | | | | 180/65.1 |
| 2012/0153718 | A1 | 6/2012 | Rawlinson et al. | |
| 2014/0057150 | A1 | 2/2014 | Takizawa | |
| 2014/0157150 | A1* | 6/2014 | Durvasula | H04L 51/16 |
| | | | | 715/753 |
| 2014/0232184 | A1 | 8/2014 | Ukai | |
| 2015/0217659 | A1 | 8/2015 | Seimiya | |
| 2016/0229293 | A1 | 8/2016 | Seo et al. | |
| 2016/0347161 | A1* | 12/2016 | Kusumi | B60L 58/20 |
| 2018/0029463 | A1 | 2/2018 | Ajisaka | |
| 2018/0065463 | A1 | 3/2018 | Kusumi et al. | |

FOREIGN PATENT DOCUMENTS

| | | |
|---|---|---|
| JP | 2003-191756 A | 7/2003 |
| JP | 2007-161024 A | 6/2007 |
| JP | 2011-020625 A | 2/2011 |
| JP | 2011-230530 A | 11/2011 |
| JP | 2012-135172 A | 7/2012 |
| JP | 2012-224152 A | 11/2012 |
| JP | 2013-180614 A | 9/2013 |
| JP | 2014-040214 A | 3/2014 |
| JP | 2015-061414 A | 3/2015 |
| WO | WO 2013/073661 A1 | 5/2013 |
| WO | WO 2015/015649 A1 | 2/2015 |

OTHER PUBLICATIONS

Jun. 16, 2020, Japanese Office Action issued for related JP application No. 2018-170801.

* cited by examiner

UNDERMOUNT DRIVE SYSTEM AND COOLING ARRANGEMENT FOR A VEHICLE

CROSS-REFERENCE TO RELATED APPLICATION (S)

This application claims priority from Japanese Patent Application No. 2018-170801 filed on Sep. 12, 2018, the entire contents of which are incorporated herein by reference.

FIELD

The present invention relates to a vehicle equipped with a drive device unit provided with a motor and a motor controller for controlling the motor.

BACKGROUND

JP-A-2012-135172 describes that motors for rear wheels and front wheels of an electric vehicle and a motor controller such as an inverter for controlling the driving of each motor can be cooled with cooling water from one radiator.

However, even when it is intended to cool the motor and the motor controller having different management temperature ranges with the cooling water from one radiator, there is a problem in that the motor and the motor controller cannot be separately properly cooled.

SUMMARY

The invention provides a vehicle capable of separately appropriately cooling a drive device accommodating a motor and a motor controller for controlling the motor.

According to the invention, there is provided a vehicle which includes a compartment, a front room located in front of the compartment, and a drive device unit provided behind the compartment and below a floor panel, in which
  the drive device unit includes
  a drive device accommodating a motor, and
  a motor controller Which controls the motor, and
  the vehicle includes
  a first cooling device located in the front room and cooling the motor controller, and
  a second cooling device located below the floor panel and cooling the drive device.

According to the invention, a drive device accommodating a motor and a motor controller for controlling the motor can be separately appropriately cooled.

DETAILED DESCRIPTION

Hereinafter, an embodiment of a vehicle according to the invention will be described based on the drawings. The drawings should be viewed in directions of reference letters. In the following description, a front and rear, a left and right, and a top and bottom are described according to the directions viewed from a driver, and in the drawing, the front of the vehicle is shown as Fr, the rear as Rr, the left as L, the right as R, the upper as U, and the lower as D.

[Overall Structure of Vehicle]

Figure 1:
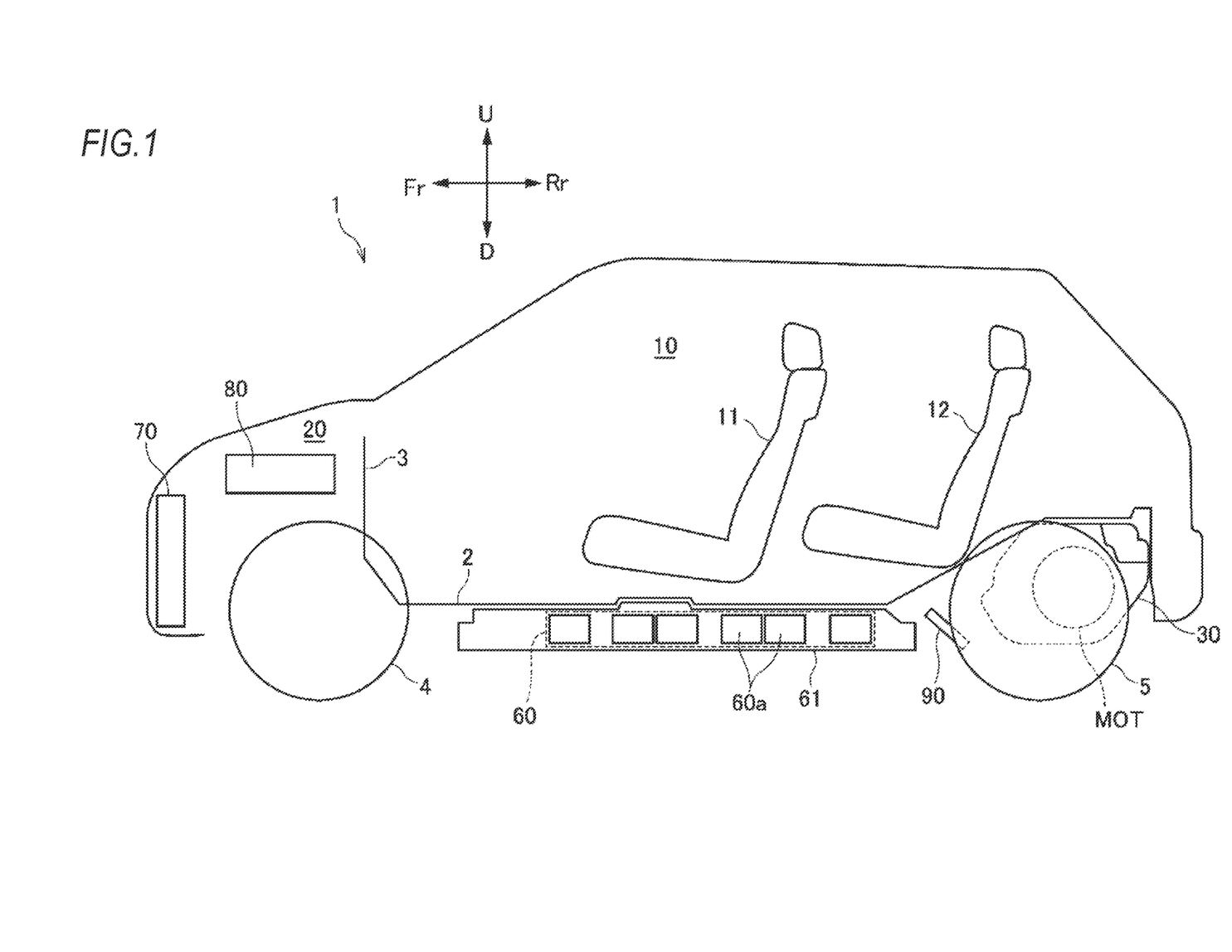
FIG. 1 is a schematic side view illustrating an overall structure of a vehicle according to an embodiment of the invention.
Figure 2:
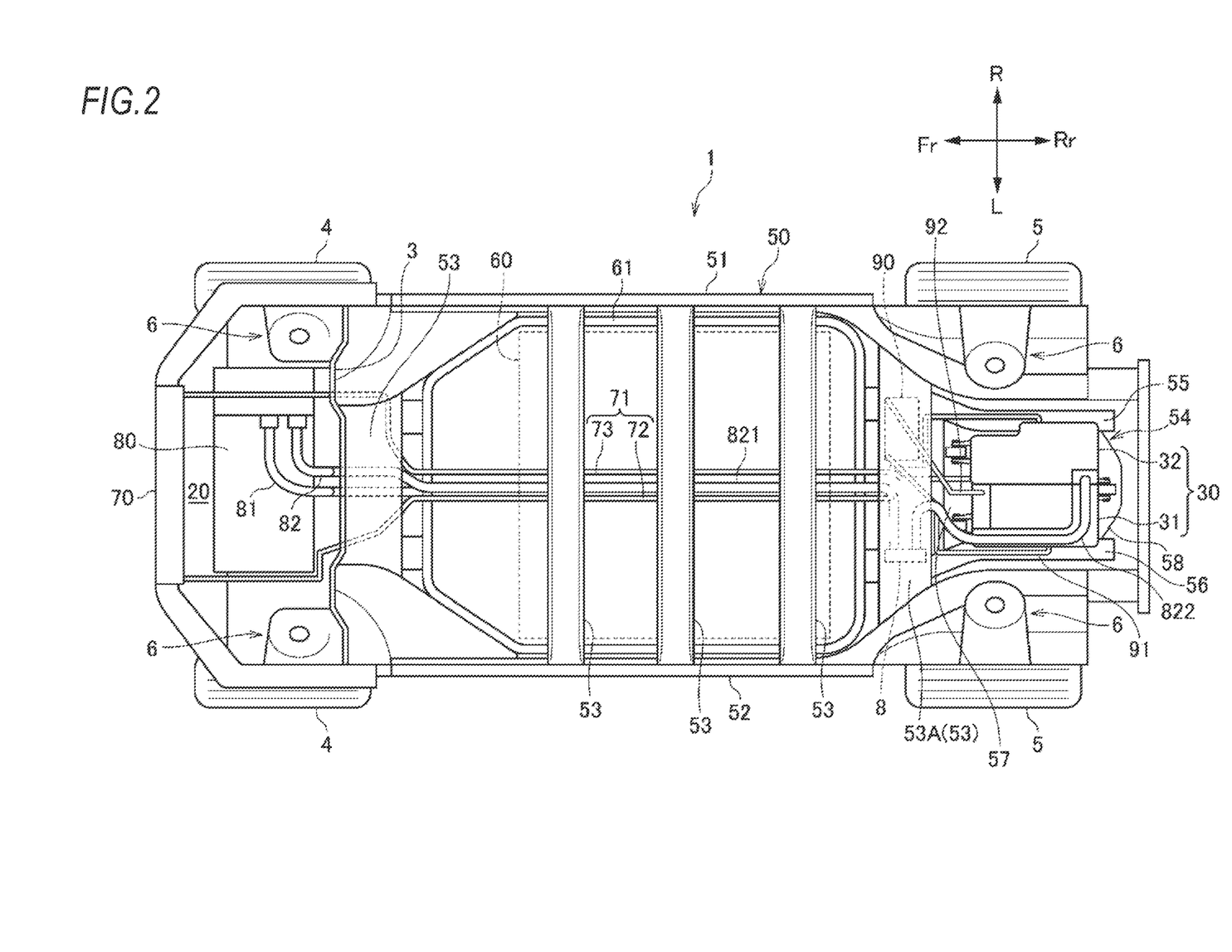
FIG. 2 is a plan view illustrating an underfloor structure of the vehicle of FIG. 1.

As illustrated in FIGS. 1 and 2, a vehicle 1 according to an embodiment of the invention is defined by a floor panel 2 and a dash panel 3 into a compartment 10 and a front room 20 in front of the compartment 10. A front seat 11 and a rear seat 12 are provided in the compartment 10. Below the floor panel 2 at the rear of the rear seat 12, a drive device unit 30 is provided. The drive device unit 30 drives left and right rear wheels 5. That is, in the vehicle 1, the left and right rear wheels 5 are drive wheels and left and right front wheels 4 are driven wheels. Each front wheel 4 and each rear wheel 5 are supported by a vehicle body frame 50 via suspensions (not illustrated) supported respectively by suspension support portions 6.

Below the compartment 10, a battery 60 constituted of a plurality of battery modules 60a is disposed. The battery 60 is accommodated in a battery case 61 and disposed below the floor panel 2.

The vehicle body frame 50 includes a pair of left and right side members 51 and 52 extending in a front-rear direction, a plurality of cross members 53 extending in a left-right direction and connecting the side members 51 and 52, and a sub-frame 54 having a rectangular shape so as to surround the drive device unit 30. The sub-frame 54 includes a pair of sub-side members 55 and 56 supported by both side members 51 and 52 and a front frame member 57 and a rear frame member 58 connecting the two sub-side members 55 and 56. The drive device unit 30 includes a drive device 31 accommodating a motor MOT as an electrical motor and a Power Control Unit (PCU) 32 as a motor controller for controlling the motor MOT. The drive device 31 and the PCU 32 are electrically connected via a bus bar (not illustrated).

[First Cooling Device]

Figure 3:
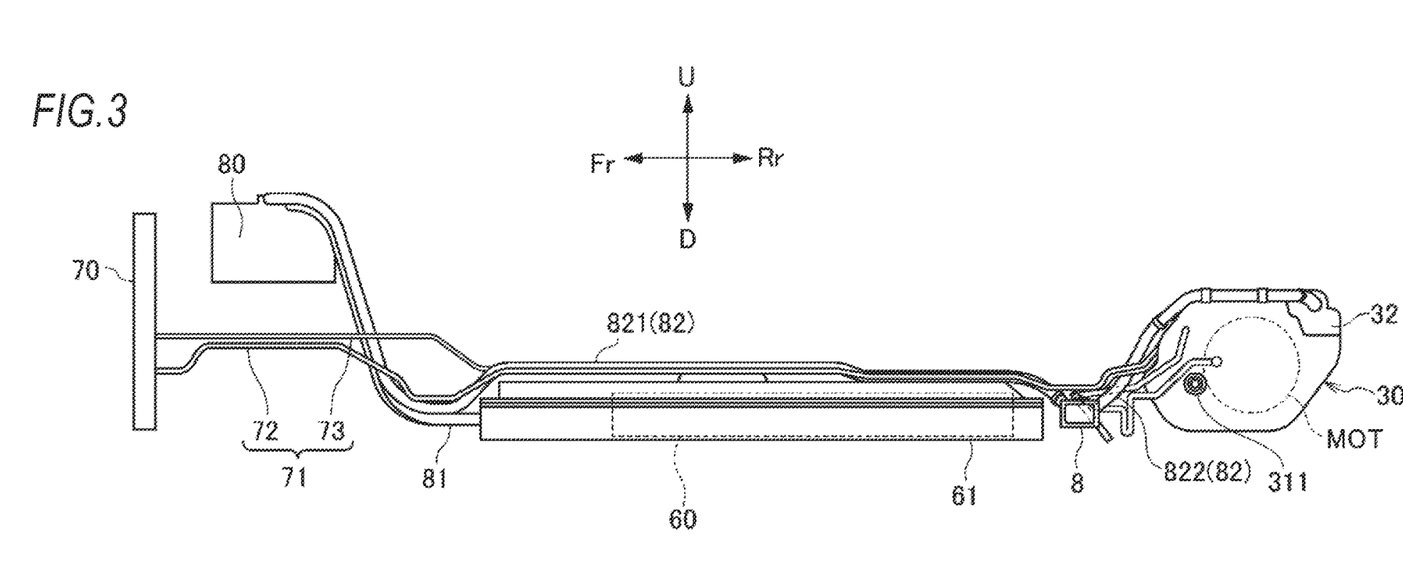
FIG. 3 is a side view illustrating a cooling pipe and a cable of the vehicle of FIG. 1.

The front room 20 is provided with a first cooling device 70 for cooling the PCU 32. The first cooling device 70 includes a radiator provided at the frontmost surface of the vehicle 1. As illustrated in FIGS. 2 and 3, the first cooling device 70 and the PCU 32 are connected by a cooling pipe 71. The cooling pipe 71 is disposed between the floor panel 2 and the battery 60 (battery case 61). The cooling pipe 71 includes a first cooling pipe 72 for supplying refrigerant from the first cooling device 70 to the PCU 32 and a second cooling pipe 73 for discharging the refrigerant from the PCU 32 to the first cooling device 70. As described above, the cooling pipe 71 (72, 73) connecting the first cooling device 70 and the PCU 32 is disposed between the floor panel 2 and the battery 60, whereby a long pipe extending in the front- and rear direction of the vehicle 1 is protected over a wide area.

[Junction Box and Cable Arrangement]

In the front room 20, as illustrated in FIGS. 1 to 3, a junction box 80 connected to a charging port (not illustrated) provided on a front top end of the vehicle 1 is provided. The junction box 80 is connected to the battery 60 via a battery cable 81 and to the PCU 32 via a PCU cable 82. The PCU cable 82 has a first cable 821 extending from the junction box 80 and a second cable 822 extending from the PCU 32 and the first cable 821 and the second cable 822 are connected to each other via a joint box 8 fixed to a lower surface of the cross member 53 (hereinafter, this cross member 53 is referred to as a support cross member 53A) located between the battery 60 and the drive device unit 30.

As illustrated in FIG. 2, the PCU cable 82 is disposed between the first cooling pipe 72 and the second cooling pipe 73. Thus, the heat of the PCU cable 82 can be suppressed by arranging the first cooling pipe 72 and the second cooling pipe 73 on both sides of the PCU cable 82. In addition to the first cooling pipe 72 and the second cooling pipe 73, the PCU cable 82 is also protected from stepping stones or the like by being disposed between the floor panel 2 and the battery 60.

[Drive Device]

Figure 4:
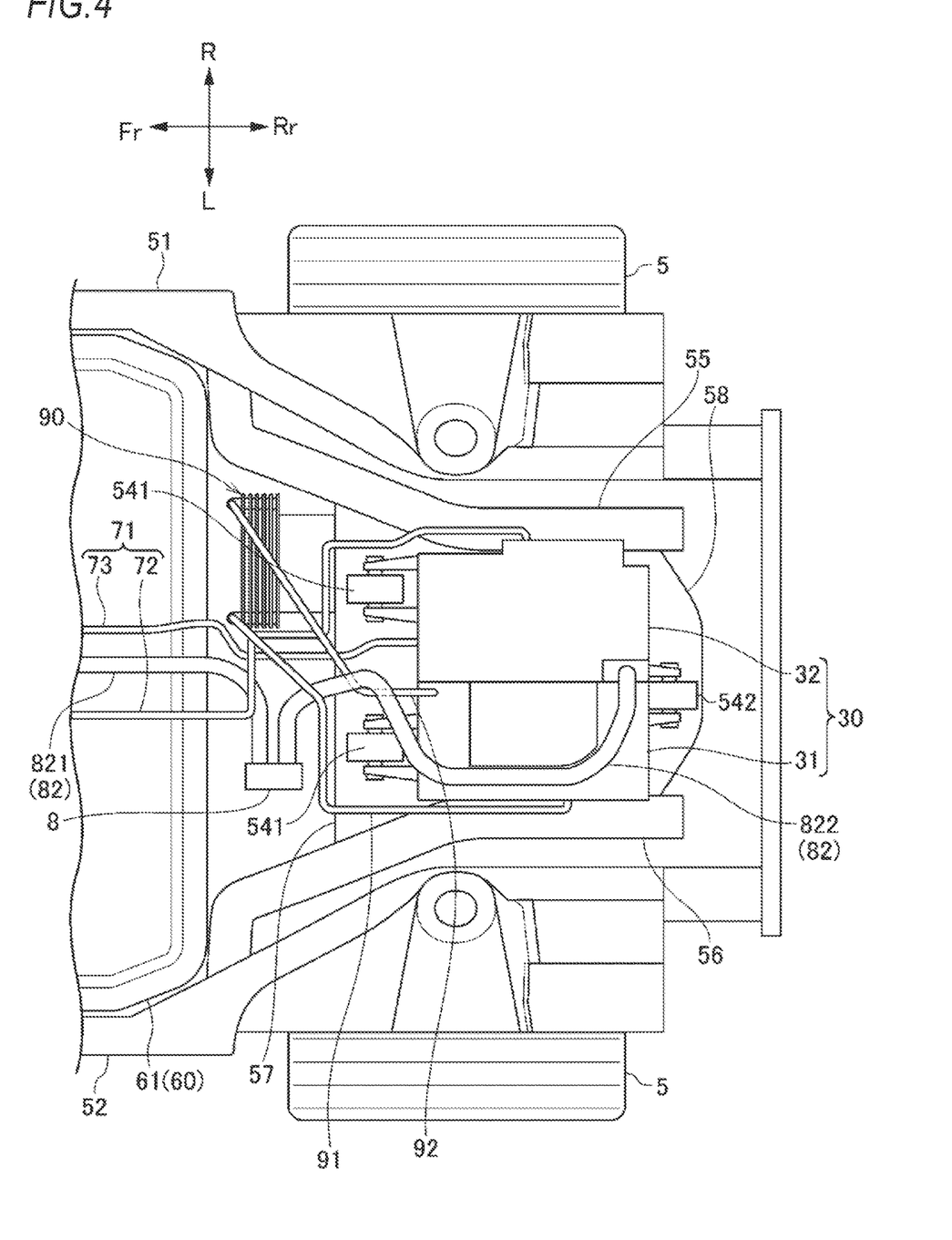
FIG. 4 is a plan view of a drive device unit of the vehicle of FIG. 1 and a periphery thereof.
Figure 5:
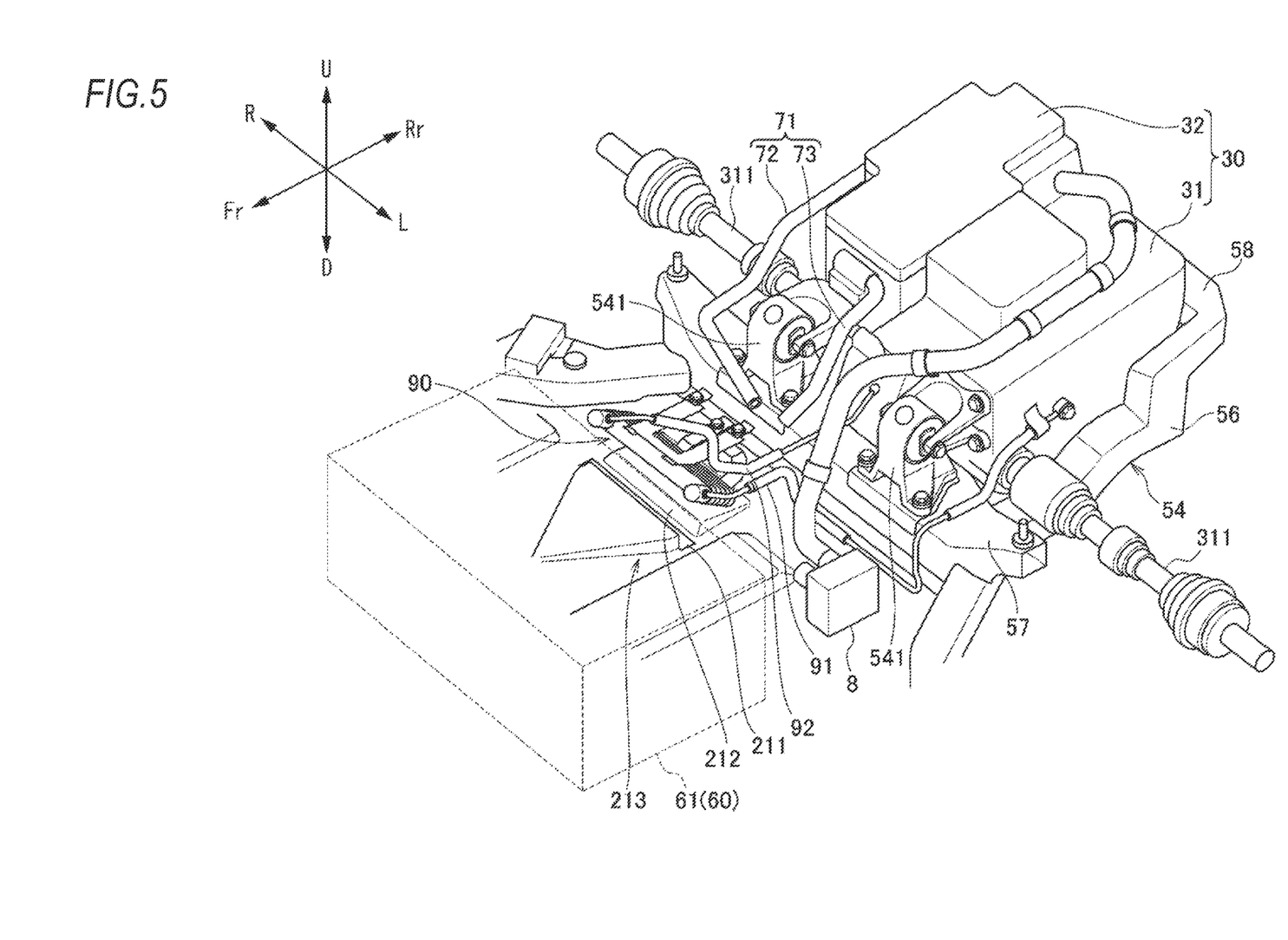
FIG. 5 is a perspective view of the drive device unit of the vehicle of FIG. 1 and the periphery thereof.

As illustrated in FIGS. 4 and 5, the drive device unit 30 is fixed to the front frame member 57 via a pair of front mounting portions 541 and is fixed to the rear frame member 58 via a rear mounting portion 542. The drive device 31 is provided with the motor MOT and a transmission (not illustrated) and the torque of the motor MOT is transmitted to an output shaft 311 via the transmission and transmitted from the output shaft 311 to the rear wheel 5.

[Second Cooling Device]

As illustrated in FIGS. 4 and 5, a second cooling device 90 for cooling the drive device 31 is disposed in a vicinity of the drive device unit 30 below the floor panel 2. The second cooling device 90 includes a radiator. The second cooling device 90 is connected to the drive device 31 via refrigerant pipes 91 and 92. The drive device 31 is cooled by circulating and supplying the refrigerant liquid (ATF) cooled by the second cooling device 90 through the refrigerant pipes 91 and 92. As described above, by separating and arranging the first cooling device 70 and the second cooling device 90 in the front-rear direction of the vehicle 1, it is possible to suppress the transfer of exhaust heat from one to the other. In addition, the first cooling device 70 for cooling the PCU 32 where management temperature is stricter and high cooling performance is required can be disposed in the front room 20 to make it possible to perform proper cooling by making the traveling wind easy to hit. On the other hand, by arranging the second cooling device 90 for cooling the drive device 31 having a high exhaust heat temperature below the floor panel 2, the temperature rise in the front room 20 can be suppressed.

Figure 6:
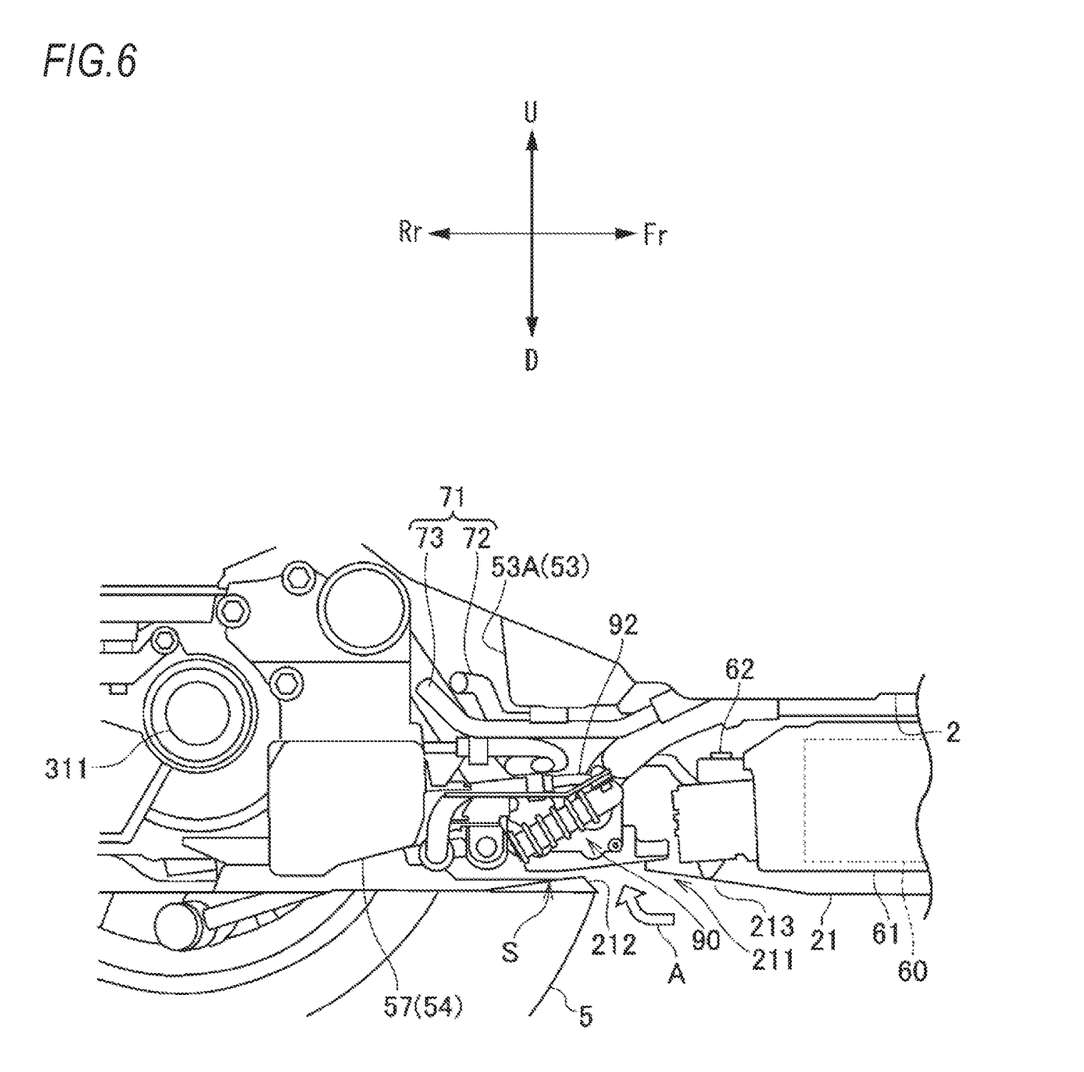
FIG. 6 is a side view of the drive device unit of the vehicle of FIG. 1 and the periphery thereof.

As illustrated in FIG. 6, the second cooling device 90 is disposed between the sub frame 54 and the battery 60 in the front-rear direction of the vehicle 1. By this configuration, the second cooling device 90 can be protected from the impact at the time of the collision of the vehicle 1 or the like, in addition, since the second cooling device 90 is disposed below the floor panel 2, the second cooling device 90 is exposed to traveling wind A when the vehicle 1 is traveling. Thus, heat exchange is performed between the coolant and the outside air, and thus the drive device 31 can be cooled efficiently. Furthermore, the second cooling device 90 is placed near the drive device 31 so that the flow path of the refrigerant pipes 91 and 92 can be shortened compared with a case where the second cooling device 90 is disposed in another place, for example, in the front room 20 of the vehicle 1.

Further, the second cooling device 90 is disposed within the width of the sub frame 54 (front frame member 57) in a height direction of the vehicle 1. According to this configuration, the second cooling device 90 can be protected more reliably from the impact at the time of the collision of the vehicle 1 or the like.

Also, the second cooling device 90 is disposed within the width of the battery 60 in the height direction of the vehicle 1. According to this configuration, the second cooling device 90 can be protected more reliably from the impact at the time of the collision of the vehicle 1 or the like.

Also, the second cooling device 90 is covered by an undercover 21 from below. The support cross member 53A (cross member 53) is present above the second cooling device 90 and in front of and above the front frame member 57. That is, the second cooling device 90 is disposed in a space S surrounded by the front frame member 57, the support cross member 53A (cross member 53), the battery 60, and the undercover 21. Thus, the safety of the second cooling device 90 is ensured by the second cooling device 90 being surrounded by the front frame member 57, the support cross member 53A (cross member 53), the battery 60, and the undercover 21. Also, by covering the second cooling device 90 with the undercover 21 from below, the second cooling device 90 can be protected from stepping stones and the like.

Here, when the second cooling device 90 is covered by the undercover 21 from below, the traveling wind is less likely to hit the second cooling device 90. However, in the present embodiment, the undercover 21 covering the second cooling device 90 from below is provided with an opening portion 211 for supplying the traveling wind A to the second cooling device 90. In addition, the second cooling device 90 is disposed behind and above the opening 211 in a state of being inclined downward from the front to the rear of the vehicle 1.

That is, the opening portion 211 is provided in front of the second cooling device 90 and the second cooling device 90 is disposed in a state where the second cooling device 90 is inclined downward from the front to the rear of the vehicle 1, whereby the second cooling device 90 is more likely to receive the traveling wind A. As a result, the heat exchange efficiency between the refrigerant liquid and the traveling wind A in the second cooling device 90 can be enhanced, and thus the cooling performance can be improved.

Further, the undercover 21 is provided with an inclined surface 212 which faces the opening portion 211 and is inclined upward from the front to the rear of the vehicle 1. The inclined surface 212 is provided behind the opening portion 211 and below the second cooling device 90. This configuration further improves the cooling performance because the traveling wind A supplied from the opening portion 211 flows toward the second cooling device 90 along the inclined surface 212.

Further, the opening portion 211 is an outlet portion of a duct 213 which is recessed by the undercover 21 so that the length in a vehicle width direction becomes gradually longer toward the rear of the vehicle 1. Thereby, the traveling wind is efficiently taken in.

[Battery Case]

As illustrated in FIG. 6, at the rear end portion of the battery case 61, a power shut-off plug 62 for shutting off the power of the battery 60 is disposed. As described above, by arranging the power shut-off plug 62 Which hardly generates heat at the rear end portion of the battery case 61, it is possible to suppress that the cooling performance of the second cooling device 90 is deteriorated by the heat of the battery 60.

In the embodiment described above, modifications, improvements, and the like can be made as appropriate. For example, in the embodiment described above, the drive device 31 provided with the transmission is illustrated.

However, the invention is not limited to this and it may be the drive device 31 provided with no transmission.

At least the following matters are described in the present specification. Although the components or the likes corresponding in the embodiment described above are shown in parenthesis, it is not limited to this.

(1) A vehicle (vehicle 1) which includes a compartment (compartment 10), a front room (front room 20) located in front of the compartment, and a drive device unit (drive device unit 30) provided behind the compartment and below a floor panel (floor panel 2), in which
the drive device unit includes
a drive device (drive device 31) accommodating a motor, and
a motor controller (PCU 32) which controls the motor, and
the vehicle includes
a first cooling device (first cooling device 70) located in the front room and cooling the motor controller, and
a second cooling device (second cooling device 90) located below the floor panel and cooling the drive device.

According to (1), by separating and arranging the first cooling device and the second cooling device in the front-rear direction of the vehicle, it is possible to suppress the transfer of the exhaust heat from one to the other. In addition, the first cooling device for cooling the motor controller where management temperature is stricter and high cooling performance is required can be disposed in the front room to make it possible to perform proper cooling by making the traveling wind easy to hit. On the other hand, by arranging the second cooling device for cooling the drive device having a high exhaust heat temperature below the floor panel, the temperature rise in the front room can be suppressed. Furthermore, the pipe connecting the second cooling device and the drive device can be shortened.

(2) The vehicle according to (1), in which
the vehicle further includes
a battery (battery 60) provided below the compartment and below the floor panel, and
a cooling pipe (cooling pipe 71) connecting the first cooling device and the motor controller is disposed between the floor panel and the battery.

According to (2), it is possible to protect the long pipe extending in the front and direction of the vehicle over a wide area.

(3) The vehicle according to (2), in which
the vehicle further includes
a junction box (junction box 80) provided in the front room to which a cable (PCU cable 82) extending from the motor controller is connected,
the cooling pipe includes
a first cooling pipe (first cooling pipe 72) which supplies a refrigerant from the first cooling device to the motor controller, and
a second cooling pipe (second cooling pipe 73) which discharges the refrigerant from the motor controller to the first cooling device, and
the cable is disposed between the first cooling pipe and the second cooling pipe.

According to (3), since the first cooling pipe and the second cooling pipe are disposed on both sides of the cable, the heat generation of the cable can be suppressed. In addition to the first cooling pipe and the second cooling pipe, the cable is also protected from stepping stones or the like by being disposed between the floor panel and the battery.

(4) The vehicle according to (2) or (3), in which
the drive device unit is fixed to a sub frame (sub frame 54) having a rectangular shape so as to surround the drive device unit, and
the second cooling device is disposed between the battery and the sub frame in a front-rear direction of the vehicle.

According to (4), the second cooling device can be protected from the impact at the time of the collision of the vehicle or the like.

(5) The vehicle according to (4), in which
the second cooling device is disposed within a width of the sub frame in a height direction of the vehicle.

According to (5), the second cooling device can be more reliably protected from the impact at the time of the collision of the vehicle or the like.

(6) The vehicle according to (4) or (5), in which
the second cooling device is disposed within a width of the battery in a height direction of the vehicle.

According to (6), the second cooling device can be more reliably protected from the impact at the time of the collision of the vehicle or the like.

(7) The vehicle according to any one of (2) to (6), in which
the battery is accommodated in a battery case (battery case 61), and
a power shut-off plug (power shut-off plug 62) which shuts off power of the battery is disposed at a rear end portion of the battery case.

According to (7), by arranging the power shut-off plug which hardly generates heat at the rear end portion of the battery case, it is possible to suppress that the cooling performance of the second cooling device is deteriorated by the heat of the battery.

The invention claimed is:

1. A vehicle which comprises a compartment, a front room located in front of the compartment, and a drive device unit provided behind the compartment and below a floor panel, wherein
the drive device unit comprises
a drive device accommodating a motor, and
a motor controller which controls the motor, and
the vehicle comprises
a first cooling device located in the front room and cooling the motor controller, and
a second cooling device located below the floor panel and cooling the drive device.

2. The vehicle according to claim 1, wherein
the vehicle further comprises
a battery provided below the compartment and below the floor panel, and
a cooling pipe connecting the first cooling device and the motor controller is disposed between the floor panel and the battery.

3. The vehicle according to claim 2, wherein
the vehicle further comprises
a junction box provided in the front room to which a cable extending from the motor controller is connected,
the cooling pipe comprises
a first cooling pipe which supplies a refrigerant from the first cooling device to the motor controller, and
a second cooling pipe which discharges the refrigerant from the motor controller to the first cooling device, and
the cable is disposed between the first cooling pipe and the second cooling pipe.

4. The vehicle according to claim 2, wherein
the drive device unit is fixed to a sub frame having a
  rectangular shape so as to surround the drive device
  unit, and
the second cooling device is disposed between the battery
  and the sub frame in a front-rear direction of the
  vehicle.

5. The vehicle according to claim 4, wherein
the second cooling device is disposed within a width of
  the sub frame in a height direction of the vehicle.

6. The vehicle according to claim 4, wherein
the second cooling device is disposed within a width of
  the battery in a height direction of the vehicle.

7. The vehicle according to claim 2, wherein
the battery is accommodated in a battery case, and
a power shut-off plug which shuts off power of the battery
  is disposed at a rear end portion of the battery case.

\* \* \* \* \*